United States Patent [19]

Wesselski

[11] Patent Number: 4,763,459
[45] Date of Patent: Aug. 16, 1988

[54] COLLET LOCK JOINT FOR SPACE STATION TRUSS

[75] Inventor: Clarence J. Wesselski, Alvin, Tex.

[73] Assignee: The United States of America as represented by the Administrator of the National Aeronautics and Space Administration, Washington, D.C.

[21] Appl. No.: 32,818

[22] Filed: Apr. 1, 1987

[51] Int. Cl.$^4$ ............................................. E04H 12/18
[52] U.S. Cl. .......................................... 52/646; 52/648; 403/217; 403/171
[58] Field of Search ............... 403/171, 172, 176, 252, 403/281; 52/646, 648, 650, 81; 411/70, 71, 72, 73, 74, 94, 57, 74, 45, 55, 107, 358; 24/604, 606, 607, 453

[56] References Cited

U.S. PATENT DOCUMENTS

| | | | |
|---|---|---|---|
| 2,794,961 | 6/1957 | Knight | 339/75 |
| 3,414,253 | 12/1968 | Mewse | 24/453 X |
| 3,424,050 | 1/1969 | Burrow et al. | 24/453 X |
| 3,633,942 | 1/1972 | Meyerhoefer | 285/7 |
| 3,697,104 | 10/1972 | Soulie et al. | 287/111 |
| 3,864,049 | 2/1975 | Ono | 403/171 |
| 3,982,841 | 9/1976 | Endzweig | 403/19 |
| 4,012,155 | 3/1977 | Morris | 403/290 |
| 4,129,975 | 12/1978 | Gabriel | 403/217 X |
| 4,313,687 | 2/1982 | Martinez Apeztegui et al. | 403/171 |
| 4,353,662 | 10/1982 | Du Chateau | 403/171 |
| 4,548,533 | 10/1985 | Pratt | 411/55 |
| 4,626,123 | 12/1986 | Brown | 403/171 X |

FOREIGN PATENT DOCUMENTS

| | | | |
|---|---|---|---|
| 2420864 | 11/1975 | Fed. Rep. of Germany | 403/171 |
| 2533721 | 2/1977 | Fed. Rep. of Germany | 52/648 |
| 2366087 | 11/1977 | Fed. Rep. of Germany | 52/648 |

OTHER PUBLICATIONS

"Space Station EVA Simulation Demonstrates Orbital Assembly", Covault, Craig, pp. 60–65, Aviation Week and Space Technology, Jan. 26, 1987.

Primary Examiner—Carl D. Friedman
Assistant Examiner—Creighton Smith
Attorney, Agent, or Firm—Russell E. Schlorff; John R. Manning; Edward K. Fein

[57] ABSTRACT

A lock joint for a space station truss has a plurality of struts (2–5) joined together in a predetermined configuration by node point fittings (1). The fittings have removable inserts (6) therein. The lock joint has an elongated housing (12) connected at one end to a strut. A split-fingered collet (53) is mounted within the housing for movement reciprocably therein. A handle (25) on the housing is connected to the collet for moving the collet into the insert where the fingers of the collet expand to lock the joint to the fitting.

26 Claims, 6 Drawing Sheets

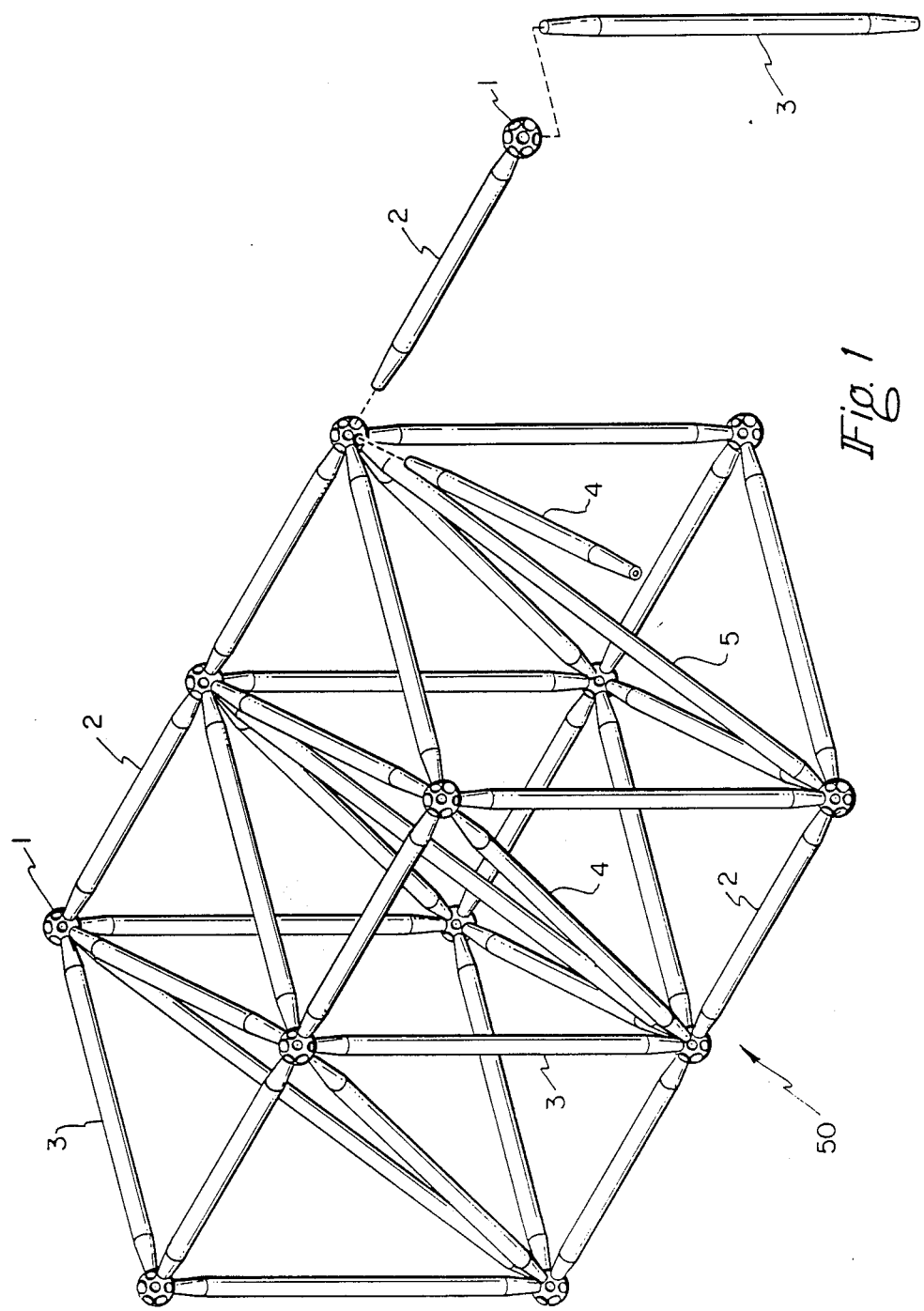

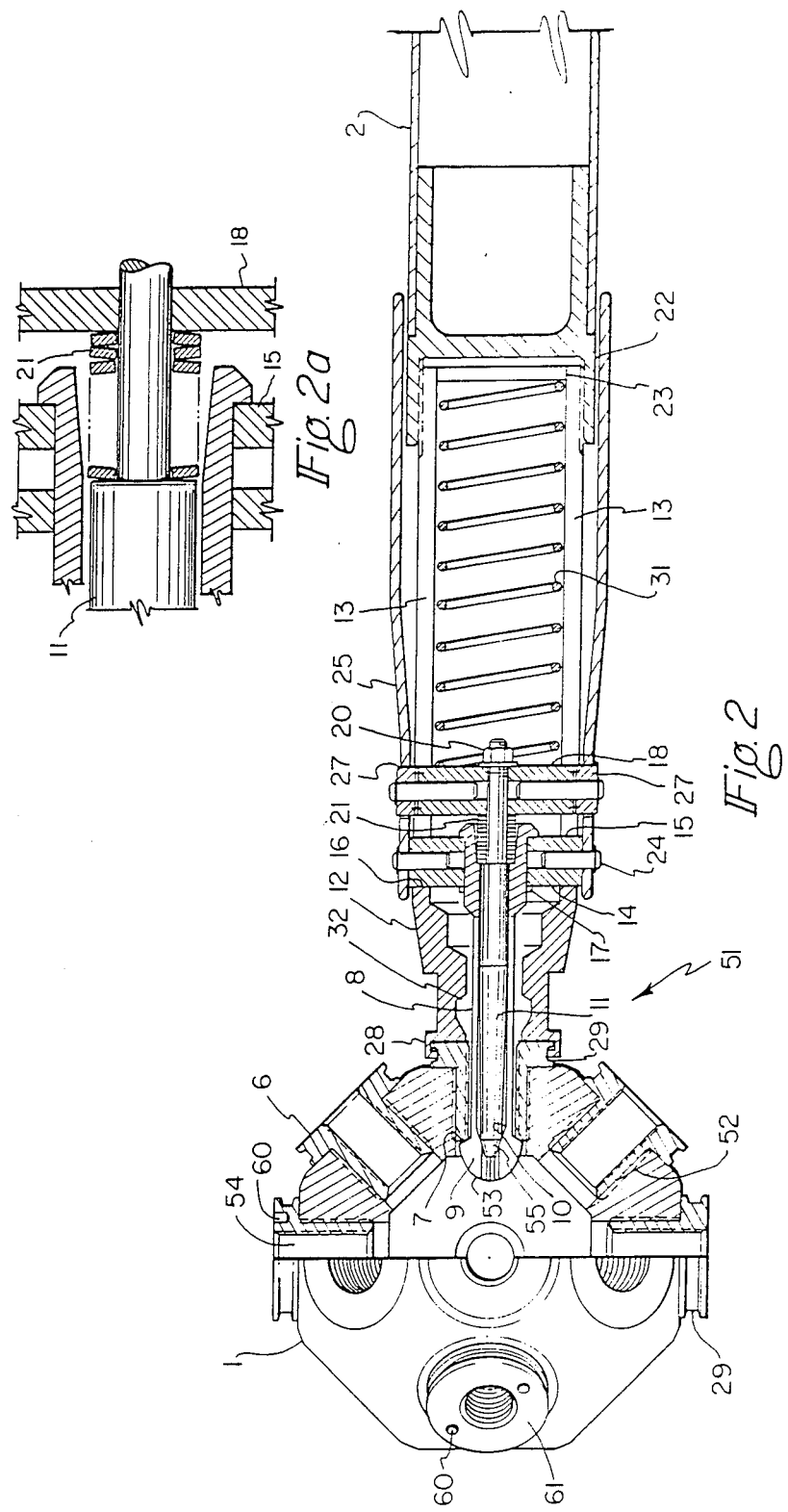

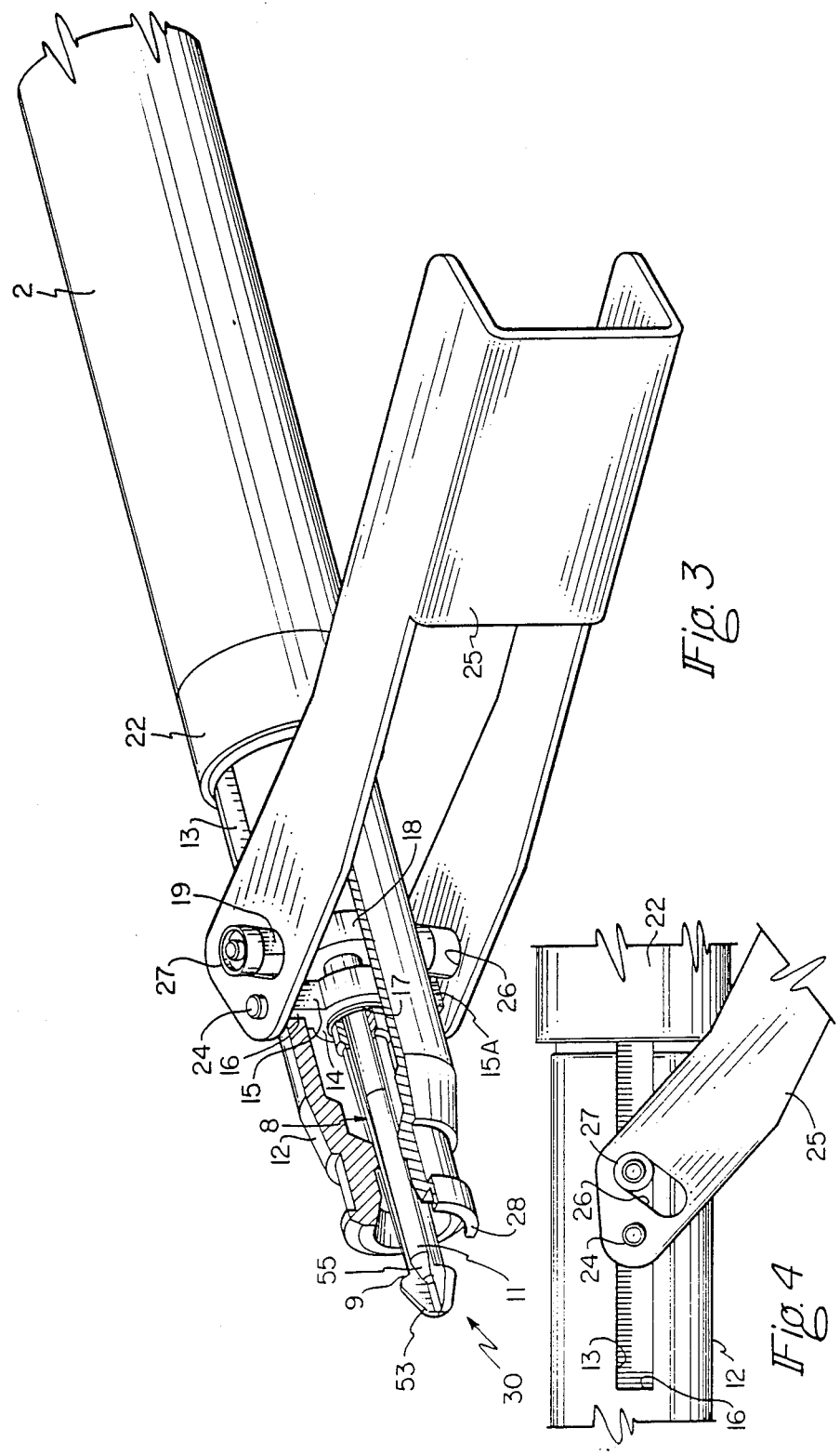

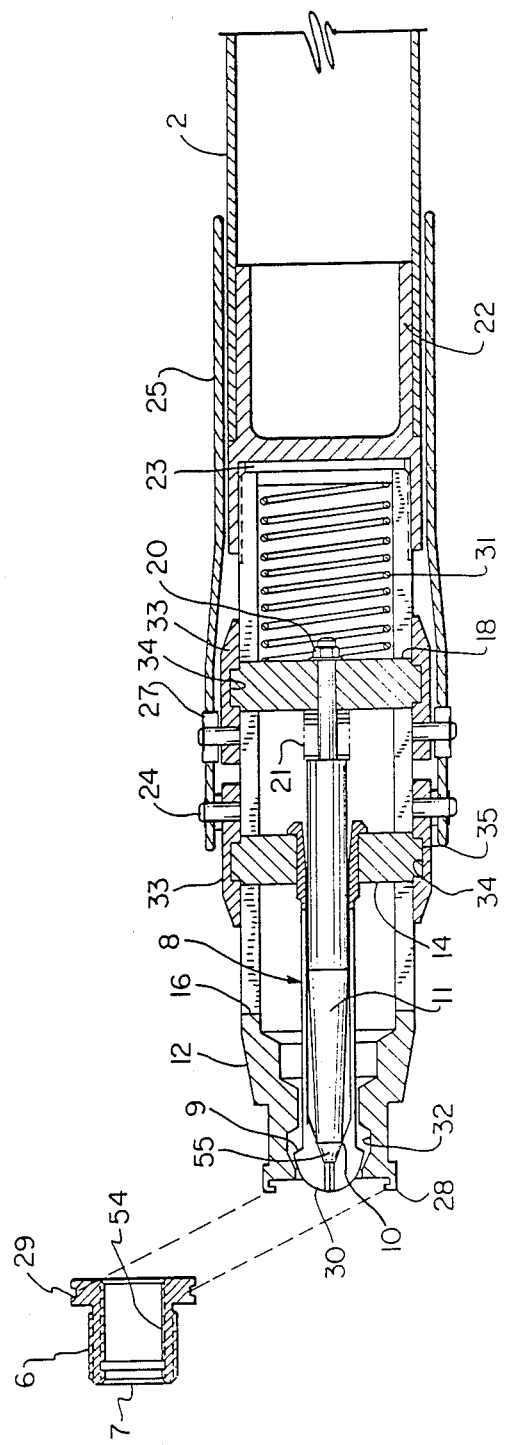

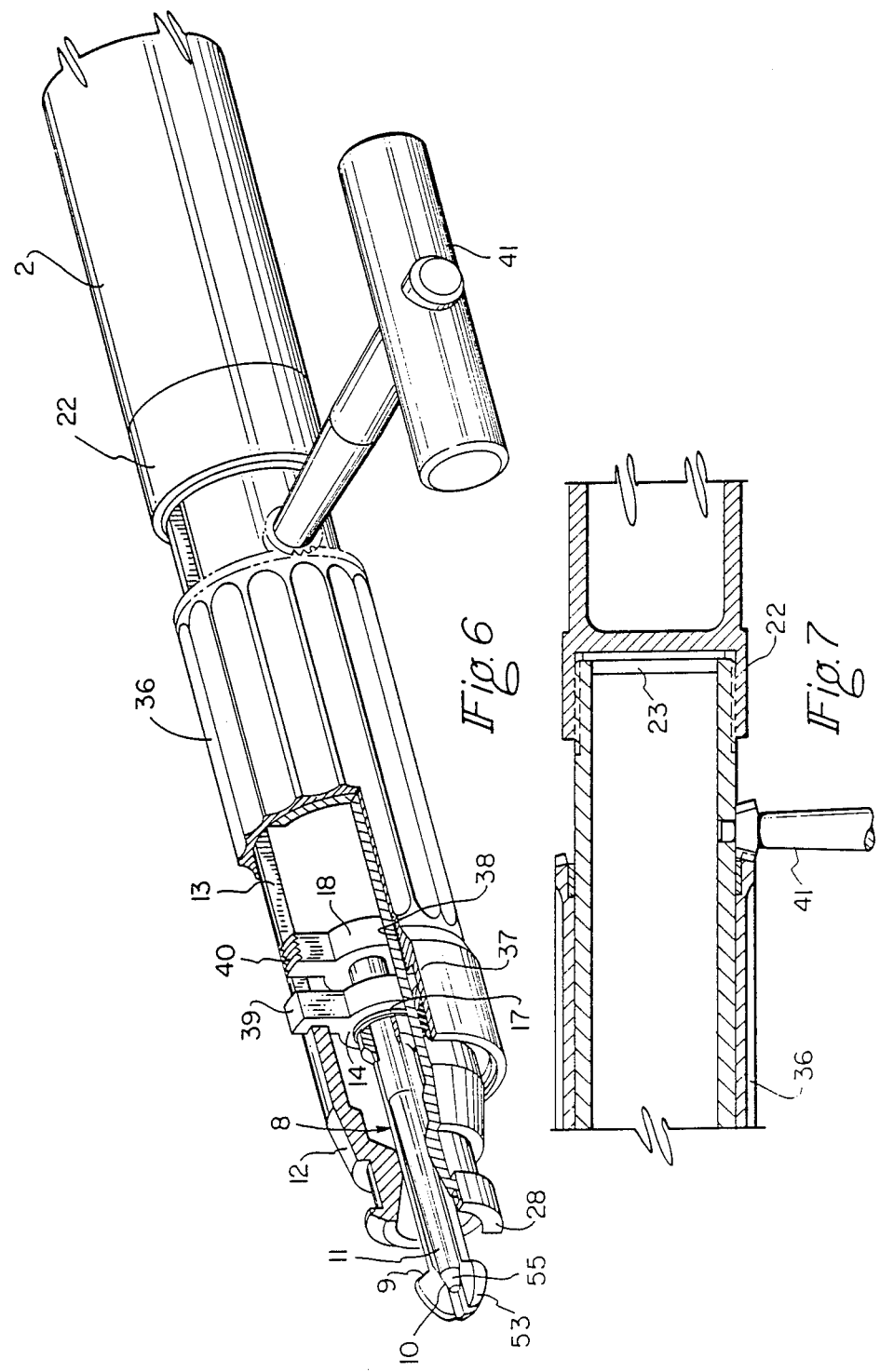

COLLET LOCK JOINT FOR SPACE STATION TRUSS

ORIGIN OF THE INVENTION

The invention described herein was made by an employee of the United States Government and may be manufactured and used by or for the Government of the United States of America for government purposes without the payment of any royalties thereon or therefor.

BACKGROUND OF THE INVENTION

1. Field of the Invention

The present baseline of the space station consists of several long lengths of 5 meter square truss and a multitude of modules, servicing facilities, scientific payloads, orbital transfers, and vehicle hangars. This square truss is erected by assembling and attaching together struts and node point fittings into a predetermined configuration. Since there are over one thousand structural connections (of strut ends to node point fittings) to be made, it is essential that these connections be easy to make and also result in a tight preloaded joint. It is the purpose of this invention to provide an attachment mechanism which the crewmen can easily operate and also to eliminate stubs that are in use at the present time.

2. Background Art

At present, stubs, several inches in length, are attached to the node point fittings in discreet locations to match the square truss configuration. This is done on earth. These node point fittings with their stubs attached are then stowed in the payload bay of the shuttle along with the struts. Each strut has an attachment mechanism at each end which is designed to fasten to the end of a stub. In orbit, the crewmen assemble and attach the struts to the stubs of the node point and thus erect the space station truss.

A primary disadvantage as will be apparent from FIG. 8 in the drawings is that it takes considerably more room to stow the node point fittings with stubs attached. Packaging is also more difficult because of the odd geometric shape. Another disadvantage is that the crewmen must be sure that he attaches each strut end to the correct stub on the node.

Following are several U.S. Patents representative of the state of the art and which are more or less pertinent to the several concepts set forth herein, but which are in no wise anticipatory thereof nor render the invention obvious.

U.S. Pat. No. 3,982,841 discloses a connecting member of node and strut construction which includes a T-Head bolt with screw twist locking means. U.S. Pat. No. 3,864,049 discloses construction elements of nodes and struts which includes a locking member 36 that seats in the node openings. U.S. Pat. No. 4,129,975 discloses a construction set having clip fasteners which includes struts with split prongs that engage to lock in node openings. U.S. Pat. No. 3,633,942 discloses a wand lock for vacuum cleaner hose connectors. U.S. Pat. No. 3,697,104 discloses couplings which include lock means to cause opening and closing of the split members. U.S. Pat. No. 4,012,155 discloses snap lock connectors which include camming surfaces to engage and lock. U.S. Pat. No. 2,794,961 discloses a detachable joint for a mast or the like which includes opposed fingers and a locking handle. The combination of a handle actuated split collet connector to engage a node with a replaceable fitting having a beveled inner surface to engage the collet and hold it in place is not taught in the prior art however.

SUMMARY OF THE INVENTION

This invention relates to a lock joint for a space station truss having a plurality of struts joined together in a predetermined configuration by node point fittings having removable inserts therein and an elongated housing having a first end and a second end, said second end adapted to be connected to one of said struts, a split-fingered collet means mounted within said housing adjacent said first end, said collet being mounted for movement reciprocably within the housing and along the axis thereof, handle means mounted on said housing and interconnected to said collet in order to move said collet along the axis of the housing in a reciprocating fashion between the first and second ends thereof, said handle means also being capable of movement between an open position and a closed position to cause said collet in the closed position to expand and lock the strut in position.

The invention further relates to a node point fitting for joining together struts of a space station truss into a predetermined configuration and having a spherical shell with a hollow interior, a plurality of spaced apart openings in said shell, removable inserts mounted within the openings in the shell, said insert having a bore therein in communication with both the shell interior and exterior, a portion of the insert serving as an anchoring point for the soft latching of a joint followed by a hard latching effected with an expanded collet passed through the bore.

A specific embodiment of the invention also covered herein relates to a lock joint for a space station truss having a plurality of struts joined together in a predetermined configuration by node point fittings having removable inserts therein and an elongated housing having a first end and a second end thereof, said second end being adapted to be connected to one of said struts, a split-fingered collet means mounted within said housing adjacent said first end, said collet being mounted for movement reciprocably within the housing and along the aixs thereof, rotatable collar means in surrounding relationship to said housing and interconnected to said collet in order to move said collet along the axis of the housing in a reciprocating fashion between the first and second ends thereof, said collar means causing the fingers of said collet to expand when rotated in a first direction about the axis of the housing and allowing the fingers of the collet to contract when rotated in the opposite direction about the axis of the housing.

The lock joint of the present invention possesses numerous advantages over the prior art devices. For example the lock joint eliminates the necessity of stubs which are currently in use and with it the bulky storage problems presented by the node point fittings requiring that stubs be attached thereto before the units are stowed. Now the node fittings may be stowed each with its respective longitudinal strut and with one fitting being arranged on one end of each strut. The lock joint increases the structural versatility of the space station truss since structural members can now be added to change the configuration of the truss without the necessity of adding a stub to the node point fitting beforehand. The cam roller and the cam slot feature of the lock joint provide for higher preloads with less input actuating force than previously required. The lock joint has a high degree of stiffness both bending and axial through its length. No special tools are required in its use or when engaging the device. Interpositioning of the lock joint permits the strut to have omni-directional engagement about its own longitudinal axis. Since the lock joint utilizes Belleville springs in order to compensate for overtravel, it is insensitive to tolerance effects. The lock joint is easily replaced since it is merely required to remove the unit from the strut and substitute a new unit in its place. The inserts of the node point fitting may also be replaced easily as need arises, and each fitting opening can be employed with an insert which can be used to bolt some item in place. The soft latch feature of the lock joint is another advantage in that it is helpful in operations that require hand assembly or for those operations where the assembly is robotic assisted. The lock joint may be soft latched and hard latched by a suited astronaut. Moreover, the envelope required for assembly or removal of a strut is such that the assembly or removal can be accomplished without removal of adjacent struts. Other advantages of this invention will be apparent from the description which follows in conjunction with the accompanying drawings and claims.

BRIEF DESCRIPTION OF THE DRAWINGS

FIG. 1 is a pictorial representation of a space station square truss assembly in accordance with the present invention.

FIG. 2 is a cross-sectional view of a lever operated lock joint connecting one end of a strut to a node point fitting. A portion of FIG. 2 is enlarged in FIG. 2A.

FIG. 3 is an isometric view, similar to FIG. 2 except that the lock joint is shown with the lever in its open position. The node point fitting has been omitted for clarity.

FIG. 4 shows a portion only of the lever operated handle including the pivot pin, the cam roller, and the cam slot in more detail.

FIG. 5 is a cross-sectional view of another embodiment of the invention wherein the lever operated handle swivels about the housing. Details of the node point fitting insert are also shown in this figure.

FIG. 6 is a third embodiment of the present invention wherein a collar rotates about the housing of the lock joint and functions as the handle of the previous embodiments. A wrench for applying a preload is also illustrated.

FIG. 7 is a cross-sectional veiw of FIG. 6 in more detail.

DETAILED DESCRIPTION OF THE PREFERRED EMBODIMENT

Figure 9:
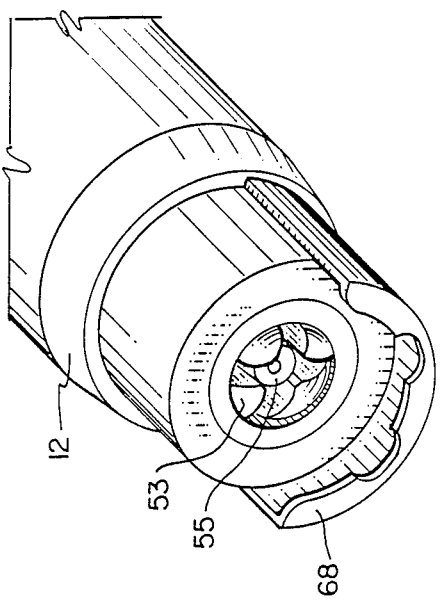
FIG. 9 is a pictorial representation of a portion only of the lock joint and illustrating a second embodiment of a capture lip in the form of a snap ring.

In FIG. 1 there will be seen a portion of a space station square truss having as its basic components node point fittings 1, and a series of construction elements such as longitudinal struts 2, batten struts 3, face diagonal struts 4, and batten diagonal struts 5. The truss is formed by joining together the various 5 strut members via the node point fittings 1.

The lock joint 51 of the present invention is shown in FIG. 2 and including its connection to one of the node point fittings 1. Fitting 1 includes a plurality of threaded openings 52 each spaced forty-five degrees apart from one another. Each opening 52 is adapted to receive an insert 6 which is screwed into the threaded opening 52 of the fitting 1 and may be removed or replaced by simply unscrewing the insert 6. Insert 6 has a threaded bore 54 having a beveled surface 7 on the backface thereof. Beveled surface 7 functions as a contact surface in order to anchor therein fingers 53 of the split collet 8. The insert 6 only extends a slight distance above the surface of the node fitting 1 and is so arranged that all of the various struts shown in FIG. 1 can be added or removed without interfering with one another. The threaded bore allows attachment of various elements such as guy wires, tethers, etc.

Split collet 8 includes an angled shoulder surface 9 which is brought into contact with the beveled backface surface 7 of the insert 6 when these elements are mated together. Collet 8 is split into fingers 53 in such a way that it will pass through the inner diameter of bore 54 of the insert 6 when in its contracted state, and expand so that surface 9 thereof is brought into contact with surface 7 of the insert 6 thus preventing the collet 8 from being withdrawn. Collet 8 further includes an inner conically-shaped surface 10 that provides a wedging surface. This wedging surface has a shallow cone angle in order to enable the collet 8 to be easily wedged apart. This wedging action is effected with an expander rod 11 having an angled tip 55 which matches surface 10 of collet 8.

The locking mechanism is contained within an elongated housing 12 having a pair of diametrically opposed slots 13. A collet guide plate 14 is attached to the collet 8 and as shown in FIG. 3 includes an upper projecting lug 15 as well as a corresponding lower lug 15 A. Lugs 15 and 15 A are arranged for a free sliding fit in the upper and lower slots 13 of housing 12. When collet 8 along with guide plate 14 are moved to the left as seen in FIG. 2 their travel is limited by a stop member 16 of housing 12. Snap ring 17 is provided to connect collet 8 and guide plate 14 one to the other.

A follower plate 18 is attached to the expander rod 11 and includes a pair of projecting lugs 19 similar to lugs 15 and 15 A of guide plate 14. Lugs 19 of plate 18 are also arranged to have a free sliding fit in upper and lower slots 13 of housing 12. Follower plate 18 and expander rod 11 are connected together by means of a nut 20 which also functions to hold a series of Belleville springs 21 between plate 18 and rod 11. Springs 21 are spaced from the collet wall and function in a fashion to prevent the actuating mechanism of the lock joint from overloading. A strut end adapter 22 is threadedly attached to one end of housing 12 and functions as a link between the lock joint 51 and the struts 2-5 of the truss 50. A spacer 23 is provided in order to avoid collapse of the end of the housing 12.

As shown in FIGS. 2-4, collet guide plate 14 carries upper and lower pivot pins 24, and a lever actuated handle 25 is arranged to rotate about pins 24. A cam slot 26 best seen in FIG. 4 is cut into lever 25 and slot 26 engages a cam roller 27 carried by follower plate lug 19. In FIG. 4, when the lever 25 is rotated counterclockwise, the cam action forces the cam roller 27 to be translated to the left. This forces the follower plate 18 and the expander rod 11 to translate toward the collet guide plate 14 and the collet 8. This action causes the collet fingers 53 to expand radially outwardly. It should be noted that the lever 25 can be moved in two modes. It can be translated along the centerline of the strut in which case the collet 8 and the expander rod 11 are also translated in unison along the strut centerline, or it can be pivoted either clockwise or counterclockwise in which case the expander rod 11 translates with respect to the collet 8.

As shown in FIG. 3, featured in the design is a capture lip 28 which is extended approximately 180 degrees on one end of the housing 12. This capture lip 28 can either be machined integral with the housing 12 or be fastened thereto as a separate part. The capture lip engages a groove 29 which is machined in insert 6. The collet 8 has a rounded nose 30 and the entire collet and expander rod assembly is spring loaded by spring 31. A groove 32 is machined into housing 12 so that the collet 8 cannot extend out too far when the lever 25 is in the zero degree position. This permits the collet nose 30 to act as a detent button so that when a strut is inserted laterally toward the node point fitting, it snaps into place thus providing an initial capture or soft latch. The amount of force necessary to snap in place depends on the spring load 31. This soft latch feature serves to hold the strut in position temporarily until the astronaut makes the hard latch. Hard latch is accomplished by first rotating the lever 25 to the open position and sliding the handle to the left as shown in FIG. 3. This permits collet 8 and lever assembly 25 to translate so that collet 8 extends into the node point insert 6. The lever 25 is then rotated toward the zero degree position thus firmly locking the strut to the node as shown in FIG. 2. Instead of using the nose 30 of the collet 8 as a detent to accomplish soft latch, a capture latch in the form of a snap ring, see FIG. 9 may be utilized.

FIG. 1 shows typically how the truss 50 is assembled. With such design, one node fitting 1 is stowed with each longitudinal member 2. Assembly does not require the node fittings 1 to be handled as separate entities. Instead, only the struts some of which have node fittings 1 already attached thereto are handled. Assembly thus becomes a process of maneuvering or manipulating each strut 2-5 into position and soft latching to its respective node fitting 1. Whenever convenient, each connection is provided a final hard latchdown.

For a more convenient operation, it is desirable to have a lever 25 that is able to swivel about the strut centerline. FIG. 5 shows a lock joint with a lever 25 that rotates 360 degrees about the strut centerline. This embodiment is similar to FIG. 2 except that it includes swivel rings 33. There are two such identical rings. Rings 33 contain a groove 34 and plates 14 and 18 have projecting lugs 35 which rotate inside of groove 34. One ring contains the pivot pin 24 about which handle 25 rotates. The other ring contains rollers 27 which engage the camming slots 26 of the lever 25, see FIG. 10.

A third embodiment of the present invention will be seen in FIGS. 6 and 7 in which a rotating collar 36 provides the locking force. Collar 36 includes a groove 37 and a set of interior threads 38. Collet guide plate 14 has a pair of projecting lugs 39 which engage the groove 37 in collar 36. Follower plate 18 has a pair of lugs 40 and each lug 40 includes partial male threading 43. Threaded lugs 40 engage the female threads 38 of collar 36. In operation, collar 36 may be moved from right to left along the centerline of housing 12 in order to move collet 8 and rod 11 in unison to the left, or vice versa. However, rotation of collar 36 causes follower plate 18 to move relative to guide plate 14 with the result that expander rod 11 causes fingers 53 to spread apart. A key wrench 41 may be employed in the final tightening operation.

Figure 8:
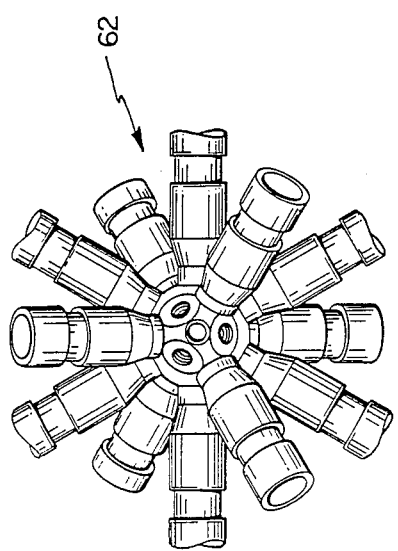
FIG. 8 is a pictorial representation of a node point fitting having a plurality of stubs attached thereto.

It should be apparent that the node point fitting arrangement of the present invention as depicted in FIGS. 1-2 is of more compact design and thus preferred to the heretofore employed cumbersome arrangement of stubs 62 seen in FIG. 8. In addition, spinner holes 60 and 61 are provided in each insert 6 in order to remove or tighten each insert with a wrench, not shown.

Figure 10:
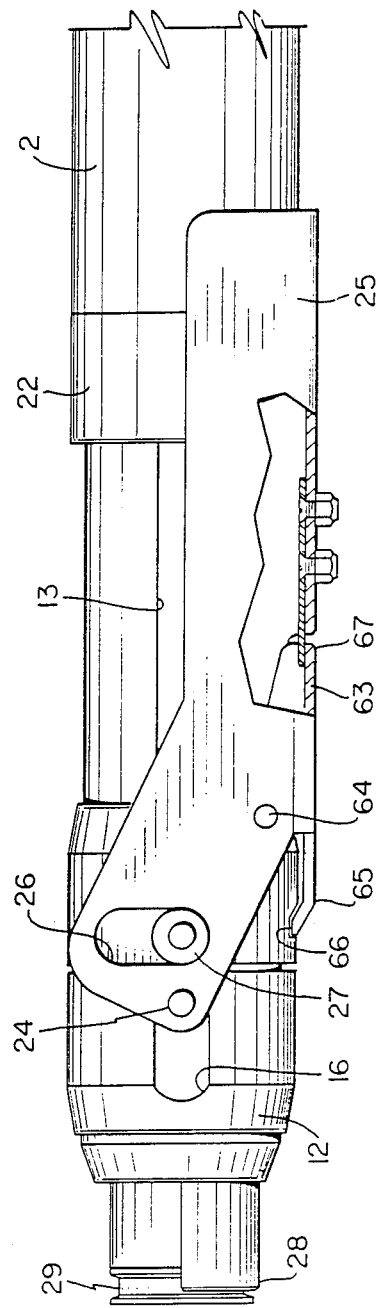
FIG. 10 is a pictorial representation partly in cross-section of the lock joint and including details of a latching mechanism for the handle of the lock joint.

In FIG. 9 there will be seen a preferred form of capture lip in the form of a snap ring 68 which is arranged to extend about 180 degrees around groove 29 of insert 6 during the hard and soft latching of the lock joint 51 to the node fitting insert 6. In soft latching, snap ring 68 is slipped over insert 6 and into groove 29 wherein lock joint 51 will be held in place to node fitting 1 but in a loose relationship. The hard latch is established by moving handle 25 from its position as seen in FIG. 3 to its position as shown in FIGS. 2, 5 and 10. Handle 25 is maintained in its closed position as in FIGS. 2, 5 and 10, by a latch 63 which is attached to the handle by pivot pin 64 and includes a lip 65. To release handle 25 pressure is applied to latch end 67 which pivots latch lip 65 out of groove 66 thus freeing handle 25 for movement along housing 12 as depicted in FIG. 3 for example.

While several embodiments of the invention have been described, other variations thereof can be made without departing from the teachings of the invention. Therefore, it is intended that the scope of the invention be limited only by the claims which follow.

I claim:

1. A lock joint for a truss having a plurality of struts joined together in a predetermined configuration by node point fittings having inserts having a bore therein comprising an elongated housing having a first end and a second end, said second end adapted to be connected to one of said struts, a split-fingered collet means mounted within said housing adjacent said first end, said collet being mounted for movement reciprocably within the housing and along the axis thereof, means mounted on said housing and interconnected to said collet in order to move said collet along the axis of the housing in a reciprocating fashion from within the housing to within the bore of the insert, said moving means being capable of movement between an open position and a closed position, said moving means further causing said collet to expand when moved from said open position to said closed position thereof, including a guide plate located within said housing and attached to said collet for guiding said collet along a path generally coincident with the axis of the housing, and a follower plate within said housing and movable with respect to said guide plate and independently thereof.

2. The lock joint of claim 1 and including an expander rod attached to said follower plate and positioned within said collet whereby movement of said follower plate toward said collet causes said rod to expand the collet when said moving means is moved from its open position to the closed position thereof.

3. The lock joint of claim 2 in which a pivot pin is attached to said guide plate and to said moving means in order to allow said moving means to move between its open and closed positions.

4. The lock joint of claim 3 and wherein said moving means is interconnected to said collet by means of a cam roller and wherein said moving means includes a cam slot in cooperating relationship to said cam roller in order to allow said moving means to be moved between its open and closed positions.

5. The lock joint of claim 4 wherein said housing includes at least one elongated slot therein extending parallel to the axis thereof and within which said cam roller rides, said moving means including latch means engageable with said housing for maintaining said moving means in said closed position and disengageable therefrom to allow movement of said moving means to said open position.

6. The lock joint of claim 5 in which said roller is attached to said follower plate whereby movement of said moving means toward and away from said housing forces said expander rod into and out of said collet respectively.

7. The lock joint of claim 6 wherein there is provided a plurality of Belleville springs located between said follower plate and said expander rod in order to avoid overloading thereof.

8. The lock joint of claim 7 in which one end of the collet has a rounded nose and an angled shoulder surface thereon, and the interior of said collet end includes a conical surface which provides a wedging surface, said expander rod having an angled tip thereon matching the interior conical surface of the collet in order to wedge the collet fingers apart.

9. The lock joint of claim 8 wherein each of said guide plate and said follower plate include lug means thereon, and with said pivot pin and said roller being attached to their respective plate by means of said lug means, said lug means being adapted to travel within said elongated slot of said housing.

10. The lock joint of claim 2 wherein means are provided for mounting said moving means for swivelling movement about the axis of the housing in addition to movement of the moving means toward and away from the housing and reciprocably therealong.

11. The lock joint of claim 10 wherein said mounting means includes a circumferential groove on the housing interior and with said guide plate being positioned for rotary movement within the groove.

12. The lock joint of claim 11 wherein each plate includes a circumferential lug means thereon and with the lug mean of said guide plate being positioned within said groove.

13. A node point fitting for joining together struts of a space station truss into a predetermined configuration comprising a spherical shell having a hollow interior, a plurality of spaced apart openings in said shell, the openings in the shell being spaced apart from one another forty-five degrees, at least one removable insert mounted within one of the openings in the shell, at least a portion of the exterior surface of the insert is screw threaded and cooperates with mating screw threads within the inner periphery of each opening in order to provide a removable relationship between the insert and the shell, said insert having a bore therein in communication with both the shell interior and exterior, the insert having a circumference capable of establishing a soft latch with a strut followed by a hard latch for maintaining said configuration, a groove is machined in the circumference of the insert that is located on the exterior side of the shell, and the soft latch is established by a snap ring on the strut engaged in the groove, a portion of the insert extending within the interior of the shell and having a beveled inner surface thereon, said beveled inner surface serving as an anchoring point for establishing the hard latch.

14. A lock joint for a truss having a plurality of struts joined together in a predetermined configuration by node point fittings having removable inserts therein comprising an elongated housing having a first end and a second end thereof, said second end being adapted to be connected to one of said struts, a split-fingered collet means mounted within said housing adjacent said first end, said collet being mounted for movement reciprocably within the housing and along the axis thereof, rotatable collar means in surrounding relationship to said housing and interconnected to said collet in order to move said collet along the axis of the housing in a reciprocating fashion between the first and second ends thereof, said collar means causing the fingers of said collet to expand when rotated in a first direction about the axis of the housing and allowing the fingers of the collet to contract when rotated in the opposite direction about the axis of the housing, and including means for mounting said collar for rotational movement about the housing and around an axis coincident with the axis of the housing, said mounting means including at least one lug having partial male threads thereon and in cooperating relationship with female threads on the inner suface of the rotatable collar.

15. The lock joint of claim 14 wherein an expander rod is attached to said lug and positioned within the collet for expanding the collet when the collar is rotated in order to force the rod into the collet, and wrench means associated with said housing and said rotatable collar in order to tighten the rotatable collar on the housing in order to preload the collet.

16. The lock joint of claim 15 wherein a guide plate is carried within the housing and attached to said collet, said plate having thereon an upstanding lug means, a circumferential groove with the interior of the collar and spaced toward the first end of the housing, said lug means being arranged to rotate within said groove as said collar is rotated.

17. A space station comprising a truss having a plurality of struts joined together in a predetermined configuration, a plurality of node point fittings for maintaining said struts in said predetermined configuration, each said fitting comprising a spherical shell having a hollow interior, a plurality of spaced apart openings in said shell, at least one removable insert mounted within one of the openings in the shell, said insert having a bore therein in communication with both the shell interior and exterior, a portion of the insert extending within the interior of the shell and having a beveled inner surface thereon, a lock joint for latching said struts to said node point fittings in order to maintain said struts in said predetermined configuration, said lock joint comprising an elongated housing having a first end and a second end, said second end adapted to be connected to one of said struts, a split-fingered collet means mounted within said housing adjacent said first end, said collet being mounted for movement reciprocably within the housing and along the axis thereof, lever-actuated handle means mounted on said housing and interconnected to said collet in order to move said collet along the axis of the housing in a reciprocating fashion between the first and the second ends thereof, said handle means also being capable of movement between an open position spaced from said housing and a closed position adjacent the housing, said handle means further causing said collet to expand when moved from said open position to said closed position thereof, said beveled inner surface of said insert anchoring said collet within the fitting upon actuation of said handle means to cause said collet to pass into said bore of said insert.

18. The space station of claim 17 and wherein said handle is interconnected to said collet by means of a cam roller, and wherein said handle includes a cam slot in cooperating relationship to said cam roller in order to allow said handle to be moved between its open and closed positions.

19. The space station of claim 18 wherein said housing includes at least one elongated slot therein extending parallel to the axis thereof and within which said cam roller rides.

20. The space station of claim 19 and including a guide plate located within said housing and attached to said collet for guiding said collet along a path generally coincident with the axis of the housing, and a follower plate within said housing and movable with respect to said guide plate and independently thereof.

21. The space station of claim 20 and including an expander rod attached to said follower plate and positioned within said collet whereby movement of said follower plate toward said collet causes said rod to expand the collet fingers when said handle is moved from its open position to the closed position thereof.

22. The space station of claim 21 in which a pivot pin is attached to said guide plate and to said handle in order to allow said handle to move between its open and closed positions.

23. The space station of claim 22 in which said roller is attached to said follower plate whereby movement of said handle toward and away from said housing forces said expander rod into and out of said collet respectively.

24. The space station of claim 23 wherein there is provided a plurality of Belleville springs located between said follower plate and said expander rod in order to avoid overloading thereof.

25. The space station of claim 24 in which one end of the collet has a rounded nose and an angled shoulder surface thereon, and the interior of said collet end includes a conical surface which provides a wedging surface, said expander rod having an angled tip thereon matching the interior conical surface of the collet in order to wedge the collet fingers apart.

26. The space station of claim 25 wherein each of said guide plate and said follower plate include lug means thereon, and with said pivot pin and said roller being attached to their respective plate by means of said lug means, said lug means being adapted to travel within said elongated slot of said housing.

* * * * *